United States Patent [19]

Fink

[11] 4,284,952
[45] Aug. 18, 1981

[54] NEUTRAL BEAM MONITORING

[75] Inventor: Joel H. Fink, Livermore, Calif.

[73] Assignee: The United States of America as represented by the United States Department of Energy, Washington, D.C.

[21] Appl. No.: 853,371

[22] Filed: Nov. 21, 1977

[51] Int. Cl.³ ............... G01R 27/00; G01N 27/78
[52] U.S. Cl. ............................ 324/464; 250/251; 324/71 R
[58] Field of Search ............ 324/33, 71 EB, 464, 324/459, 71 R; 250/251, 252, 374; 313/231.3, 93

[56] References Cited

U.S. PATENT DOCUMENTS

| | | | |
|---|---|---|---|
| 2,657,315 | 10/1953 | Goldstein | 313/93 |
| 2,943,196 | 6/1960 | Eickhoff | 324/33 |
| 3,300,640 | 1/1967 | Eubank | 250/43.5 |
| 3,430,131 | 2/1969 | Dryden | 324/33 |
| 3,679,973 | 7/1972 | Smith, Jr. et al. | 324/33 |
| 3,713,967 | 1/1973 | Hamilton et al. | 176/5 |

OTHER PUBLICATIONS

Ehlers et al.; "Design and Operation . . ."; J. Vac. Sci. Technol.; vol. 10; No. 6; Nov./Dec. 1973; pp. 922–925.
Kim et al.; "The PLT and TFTR Neutral . . ."; Oak Ridge Nat. Lab.-Proc. of Second Topical Meeting . . .; Sep. 21-23, 1976; pp. 1213-1220.
Shalz et al.; "A Computer Based . . ."; Proc. Seventh Sym. on Eng. Problems in Fusion Research; vol. 2; Oct. 25-28, 1977; pp. 1549-1553.
Kim et al.; "Design Considerations . . ."; Proc. Sixth Sym. on Eng. Problems in Fusion Research; Nov. 18-21, 1975; pp. 194-197.
Kim et al.; "A Heat Transfer Study . . ."; Proc. Seventh Sym. on Eng. Problems in Fusion Research; vol. 2; Oct. 25-28, 1977; pp. 1593-1594.

Primary Examiner—Ernest F. Karlsen
Attorney, Agent, or Firm—Edward L. Levine

[57] ABSTRACT

Method and apparatus for monitoring characteristics of a high energy neutral beam. A neutral beam is generated by passing accelerated ions through a walled cell containing a low energy neutral gas, such that charge exchange neutralizes the high energy ion beam. The neutral beam is monitored by detecting the current flowing through the cell wall produced by low energy ions which drift to the wall after the charge exchange. By segmenting the wall into radial and longitudinal segments various beam conditions are further identified.

4 Claims, 5 Drawing Figures

NEUTRAL BEAM MONITORING

BACKGROUND OF THE INVENTION

1. Field of the Invention:

This invention relates to neutral beams and provides method and apparatus for monitoring characteristics of the beams, particularly useful in plasma technology.

2. Description of the Prior Art:

High energy neutral beams are gaining significant importance for plasma and other technologies. Neutral beams are particularly useful as a means for adding energy to the plasma in a confining device. Where the plasma is held within a magnetic bottle, neutral beams can be projected across the magnetic field, for example, across toroidal windings or between turns of a toroidal coil.

Although the use of neutral beams has gained increasing importance, there is a paucity of technology supporting neutral beam monitoring devices. Presently neutral beams are monitored by calibrating the beam with calorimetric or beam dump means. This necessitates shutting down the operation in which the beam is required, and never provides a true indication of beam characteristics during actual beam use.

A neutral beam is typically generated by accelerating ions to a desired energy level, and subsequently passing the ion beam through a low energy neutral gas background. Through the process of charge exchange, electrons from the background gas are passed to the high energy ions, thereby neutralizing the beam.

A neutral beam thus generated can be used for plasma energy addition. However, parameters such as those indicating the amount of energy added, the continued productive operation of the confinement system, the cross section and direction of the neutral beam, are of substantial importance. As one example, if the plasma is not of sufficient density and the neutral beam is of too high an energy level, the beam can pass through the magnetic confinement or magnetic mirror and have little interaction with the plasma. Under this condition the high energy neutral beam is not attenuated, and can damage the walls of the containing reactor.

Improvements are therefore needed in the monitoring of neutral beams and in the indication of the above, and other, parameters.

SUMMARY OF THE INVENTION

This invention provides method and apparatus useful in monitoring selected characteristics of neutral beams. In those applications where neutral beams are generated by passing accelerated ions through a low energy neutral gas to achieve charge exchange, the gas is disposed within a walled cell. As a result of the charge exchange low energy ions drift to the walls of the cell and produce a current. By detecting the current, an indication of the strength of the neutral beam is obtained. The manner in which the current is detected can include specifically positioned probes or segmented walls so as to also produce an indication of the distribution and direction of the current, useful as an indication of beam direction, radial alignment, and strength along its longitudinal axis.

BRIEF DESCRIPTION OF THE DRAWINGS

The advantages, nature and additional features of the invention will become more apparent from the following description, taken in connection with the accompanying drawings, in which.

DESCRIPTION OF THE PREFERRED EMBODIMENTS

Figure 1:
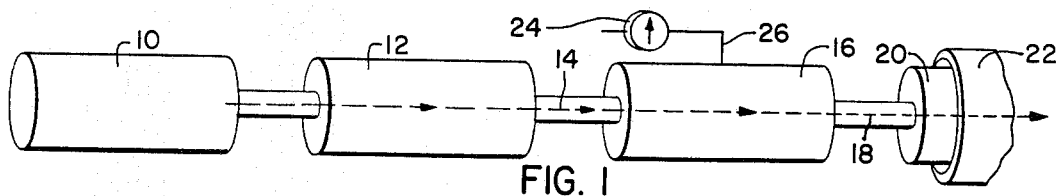
FIG. 1 is a simplified block diagram identifying the major components of one embodiment of the invention.

Referring now to FIG. 1 there are shown components in accordance with one method for forming a high energy neutral beam including an ion source 10. The ion source 10 can be of any type well known in the art, including those providing ions by electrical discharge or electrical arc. Either positive or negative ions can be formed, and both are compatible with the invention. For purposes of description, however, positive ions are described. Ions of hydrogen, deuterium, tritium and helium are commonly utilized.

The positive ions are formed by stripping electrons from neutrals, and the ions are then passed to means, also known in the art, which accelerate the ions to the desired energy range, such as the accelerator 12. For purposes of plasma research and formation, and for controlled nuclear fusion, ion energies in the range of twenty Kev and higher, into the Mev range, are desirable. Typical accelerators include a plurality of charged grid plates (not shown) to accelerate the ions. The ion source and accelerator are typically arranged to collimate the ions into a thin focused ion beam 14.

The ion beam is next passed to a neutralizing cell 16. The cell can be of various geometric configurations, although it is preferably elongated, having a length dimension several times greater than the lateral cross section. The cell 16 contains a background gas or vapor maintained at relatively low pressure and temperature, for example deuterium gas at 20 degrees centigrade and $10^{-3}$ torr. Background gases commonly used in the neutralizer cell 16 include hydrogen, deuterium, tritium and helium. As the ion beam 14 passes through the cell 16 a portion of the energetic ions undergo a charge exchange with the background gaseous medium. The positive ions, for example, undergo collisions with the gaseous atoms or molecules and acquire an electron, while negative ions, if utilized, give up an electron. In either case, competitive interactions such as charge exchange and reionization occur to a degree dependent upon parameters such as the density of the neutralizing gas, the length and geometry of the cell 16 and the energy of the ion beam. A portion of the ion beam, ranging from about ninety percent at twenty Kev to less than one percent at 500 Kev, which enters the cell 16, however, leaves the neutralization cell 16 as a collimated beam of energetic neutrals. In addition, the residual energetic positive ions travel with the beam. This emerging neutral beam 18 can then be utilized as desired, such as for etching surfaces or adding energy to a plasma held within a vessel 20 by magnetic forces formed by a plurality of specifically oriented coils 22.

While the competitive interactions occur in the gaseous neutralizing medium, also occurring is a drift of the low energy ions to the cell 16 walls. The low energy ions remain after giving up electrons to the high energy ion beam 14. While some of the low energy ions exit the cell 16 with the energetic neutral beam, a finite number will drift to the cell walls. With probabilistic analysis a reasonable basis for monitoring the neutralization process can be obtained from a monitoring of the drifting ions. Further, directional and magnitude properties of the neutral beam can be identified through monitoring of the spatial distribution of the drifting ions. While the charge exchange and reionization interactions occur, also taking place is additional ionization from direct impact of the high energy beam and the background gas. This ionization process results in the formation of a generally equivalent number of positive ions and free electrons, which also tend to drift to the cell wall where neutralization occurs. While the net current developed from this process tends toward zero, it is recognized that the distribution of the current can result in small current indications at a given monitoring location. It is also recognized that the high energy beam will not be completely neutralized, and that it also will carry away a portion of the charged particles formed by the discussed processes. Additionally, as the neutralizer cell is long as compared with its cross section, the loss of low energy particles through the entrance and exit of the cell will be small.

Figure 2:
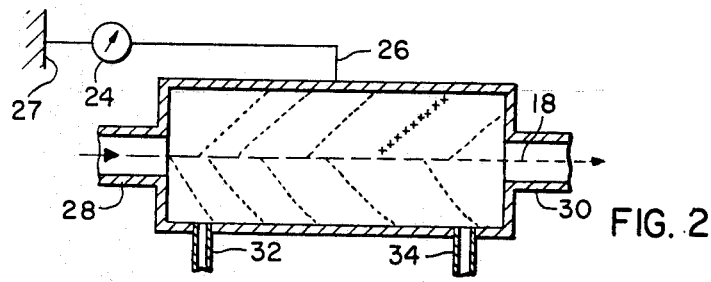
FIG. 2 is an elevation view, in cross section, of a neutralizing cell in accordance with this invention.

To perform the monitoring, an ammeter 24 or other current monitoring means is utilized in conjunction with means for discharging the neutralizing current flowing through the walls of the cell 16, such as the electrical connector 26. As shown in FIG. 2, the connection can then be to ground 27. Alternatively, the connection can be to a high voltage source 29, shown as being negative for the positive ion example. The high voltage source 29 would be positive if negative ions are utilized. Regardless of the polarity, the connection must complete the beam voltage circuit. The neutralizing cell 16 shown in FIG. 2 includes, in addition to a narrow ion beam inlet means 28 and a narrow neutral beam outlet means 30, a neutralizing gas inlet 32 and a pressure maintenance outlet 34. The gas inlet 32 is connected to a source (not shown) of the desired gaseous medium, and the pressure outlet 34 is connected to apparatus such as a vacuum pump (not shown) to control pressure within the cell 16. Since the ion source 10 is not one hundred percent efficient, some neutral gas will also tend to flow along with the accelerated ions into the neutralizing cell 16. For some applications this neutral gas represents an adequate supply for the neutralizing process so that no additional gas need be added to the cell 16.

Figure 3:
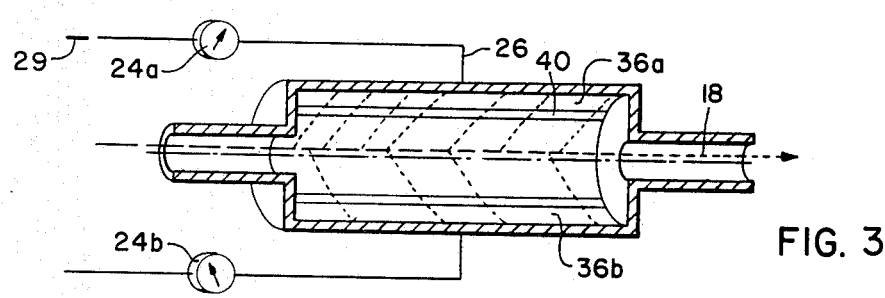
FIG. 3 is a perspective view, in cross section, of another neutralizing cell in accordance with this invention.

For some applications, it is important to know, with a great deal of accuracy, the direction at which the neutral beam is traveling as it departs the cell. If the beam is off center, as shown in FIG. 3, the condition can be detected by longitudinally segmented walls 36a, 36b, each communicating with a respective current detector 24a, 24b. The cell 16 must be specially manufactured so as to electrically insulate one segment from the next, and any convenient number of segments can be utilized. An imbalanced current from the various segments provides an indication of an improperly aligned beam, and adjustments can be made accordingly.

Figure 4:
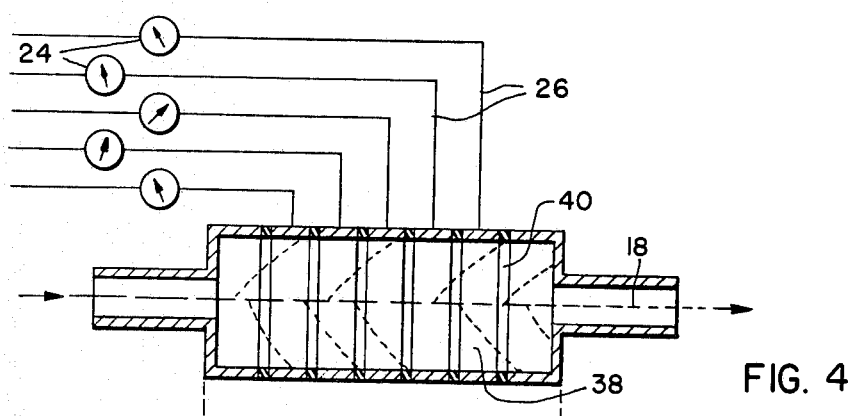
FIG. 4 is an elevation view, in cross section, of another neutralizing cell in accordance with the invention.
Figure 5:
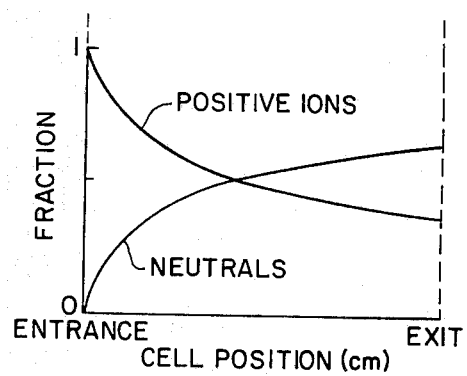
FIG. 5 is an illustrative graph plotting the fraction of two constituents (Y axis) versus neutralizing cell position (X axis).

It is also desirable to have an indication of the neutral fraction of the beam at various axial positions as it flows through the cell 16. It is well known that the neutral beam neutral fraction typically follows an exponential curve due in large part to the competitive reactions as the beam traverses the cell. A typical curve illustrating the fraction of positive ions and neutrals as a function of position in the cell 16 is shown in FIG. 5. The fraction of neutrals and ions in the beam can therefore be monitored by segmented walls 38 as shown in FIG. 4, separated by electrical insulation 40. Each segment is accordingly in communication with an ammeter 24. The segments and insulation can be comprised of many materials, since the voltage difference among segments is small but sufficient to allow separate metering. The configuration and fabrication must be sufficient to maintain pressure integrity. Accordingly, a cell comprised of, for example, copper segments separated by alumina insulators would be satisfactory. The readings provided by the segments and the respective current detection means provide an indication of the beam composition as the beam traverses the cell. It will be readily apparent that both longitudinal and radial monitoring can also be incorporated in a single cell, if desired, through desirably selected segment geometries.

It will be apparent that additions and modifications are possible in view of the above teachings. It therefore is to be understood that within the scope of the appended claims, the invention may be practiced other than as specifically described.

I claim:

1. Apparatus for monitoring selected characteristics of a high energy neutral beam generated from an accelerated, focused, high energy ion beam, comprising:
   an elongated cell having a longitudinal wall bounded by two lateral ends, the length dimension of said wall being several times greater than the dimension of said ends, one of said ends having an inlet for inletting said high energy ion beam, the other of said ends having an outlet for discharging said high energy neutral beam, said cell further having a central longitudinal axis, said inlet and outlet being aligned and disposed along said longitudinal axis;
   means for inletting a neutralizing gas into said cell;
   means for maintaining a preselected pressure within said cell;
   means for detecting the current flowing through said wall of said cell produced by low energy ions which drift to said cell wall; and
   means for directing said current flowing through said wall of said cell from said wall to said current detecting means.

2. Apparatus for monitoring selected characteristics of a high energy neutral beam generated by passing accelerated ions through a low energy neutral gas comprising:
   a. a walled cell within which said neutral gas is disposed, said cell being comprised of a plurality of segments electrically insulated from one another;
   b. means for simultaneously detecting the current flowing through each of said plurality of segments produced by low energy ions which drift to each of said segments; and
   c. means for directing said current flowing through each of said segments from each said segment to said current detection means.

3. The apparatus of claim 2 wherein said cell is elongated having a central axis therethrough and wherein said segments are longitudinally disposed parallel to said axis.

4. The apparatus of claim 2 wherein said cell is elongated having a central axis therethrough and wherein said segments are each disposed completely about said axis.

* * * * *